(12) United States Patent
Karatsu et al.

(10) Patent No.: US 7,491,283 B2
(45) Date of Patent: *Feb. 17, 2009

(54) PRODUCTION METHOD OF MULTILAYER ELECTRONIC DEVICE

(75) Inventors: Masahiro Karatsu, Chuo-ku (JP); Shigeki Satou, Chuo-ku (JP); Takeshi Nomura, Chuo-ku (JP)

(73) Assignee: TDK Corporation, Tokyo (JP)

( * ) Notice: Subject to any disclaimer, the term of this patent is extended or adjusted under 35 U.S.C. 154(b) by 540 days.

This patent is subject to a terminal disclaimer.

(21) Appl. No.: 10/540,774

(22) PCT Filed: Dec. 26, 2003

(86) PCT No.: PCT/JP03/17011

§ 371 (c)(1),
(2), (4) Date: Jun. 24, 2005

(87) PCT Pub. No.: WO2004/061880

PCT Pub. Date: Jul. 22, 2004

(65) Prior Publication Data

US 2006/0044731 A1 Mar. 2, 2006

(30) Foreign Application Priority Data

Dec. 27, 2002 (JP) .............................. 2002-378816

(51) Int. Cl.
*B32B 37/12* (2006.01)
*H01G 4/30* (2006.01)

(52) U.S. Cl. ................. 156/89.14; 156/89.16; 156/233; 156/235; 156/241

(58) Field of Classification Search ............. 156/89.12, 156/89.14, 89.16, 233, 235, 241
See application file for complete search history.

(56) References Cited

U.S. PATENT DOCUMENTS

| | | | | |
|---|---|---|---|---|
| 3,138,610 | A | * | 6/1964 | Buc et al. ................ 548/314.7 |
| 5,089,071 | A | * | 2/1992 | Tominaga et al. ......... 156/89.17 |
| 6,550,117 | B1 | | 4/2003 | Tokuoka et al. |
| 7,014,725 | B2 | * | 3/2006 | Nagai et al. ............. 156/89.11 |
| 7,318,874 | B2 | * | 1/2008 | Roosen et al. ........... 156/89.11 |
| 2003/0037857 | A1 | * | 2/2003 | Burdon et al. .......... 156/89.11 |
| 2006/0035072 | A1 | * | 2/2006 | Abe et al. ................ 428/325 |
| 2006/0096693 | A1 | * | 5/2006 | Murosawa et al. ....... 156/89.12 |
| 2006/0130320 | A1 | * | 6/2006 | Murosawa et al. ....... 29/829 |
| 2006/0180269 | A1 | * | 8/2006 | Karatsu et al. ........... 156/230 |
| 2006/0191443 | A1 | * | 8/2006 | Yamaguchi et al. ........ 106/640 |
| 2006/0254701 | A1 | * | 11/2006 | Murosawa et al. .......... 156/235 |

FOREIGN PATENT DOCUMENTS

EP  0 923 094 A2  6/1999

(Continued)

*Primary Examiner*—Philip C Tucker
*Assistant Examiner*—Kimberly McClelland
(74) *Attorney, Agent, or Firm*—Oliff & Berridge, PLC

(57) ABSTRACT

At the time of pressing an electrode layer 12*a* against a surface of a green sheet 10*a* having a thickness of 3 μm or thinner to bond the electrode layer 12*a* with the surface of the green sheet 10*a*, an adhesive layer 28 having a thickness of 0.02 to 0.3 μm is formed on a surface of the electrode layer 12*a* or the surface of the green sheet 10*a*. It is possible to easily transfer a dry type electrode layer to the surface of the green sheet with high accuracy without breaking or deforming the green sheet.

14 Claims, 8 Drawing Sheets

FOREIGN PATENT DOCUMENTS

| | | | |
|---|---|---|---|
| JP | A 63-51616 | 3/1988 | |
| JP | A 03-096208 | 4/1991 | |
| JP | A 03-250612 | 11/1991 | |
| JP | A 04-280614 | 10/1992 | |
| JP | A 04-282812 | 10/1992 | |
| JP | A 05-082388 | 4/1993 | |
| JP | A 06-232000 | 8/1994 | |
| JP | A 07-122457 | 5/1995 | |
| JP | A 07-312326 | 11/1995 | |
| JP | A 08-153646 | 6/1996 | |
| JP | A 11-238646 | 8/1999 | |
| JP | 2000-332385 | * | 11/2000 |
| JP | 2000-357625 | * | 12/2000 |
| JP | A 2001-023853 | | 1/2001 |
| JP | A 2001-052952 | | 2/2001 |
| JP | 2001-60528 | * | 3/2001 |
| JP | A 2001-162737 | | 6/2001 |
| JP | 2002-84056 | * | 3/2002 |
| JP | A 2002-203709 | | 7/2002 |
| JP | A 2002-260954 | | 9/2002 |
| JP | A-2002-361618 | | 12/2002 |
| WO | 02/074715 | * | 9/2002 |
| WO | 03/036667 | * | 5/2003 |

* cited by examiner

PRODUCTION METHOD OF MULTILAYER ELECTRONIC DEVICE

TECHNICAL FIELD

The present invention relates to a production method of a multilayer electronic device, such as a multilayer ceramic capacitor.

BACKGROUND ART

In recent years, along with a variety of electronic apparatuses becoming more compact, an electronic device to be installed in an electronic apparatus has become more compact and higher in performance. A multilayer ceramic capacitor as one of the electronic devices is also expected to be more compact and higher in performance.

For pursuing a more compact multilayer ceramic capacitor having a larger capacity, there has been a strong demand for a thinner dielectric layer. Recently, a thickness of a dielectric green sheet has come to several µm or thinner.

To produce a ceramic green sheet, ceramic slurry made by ceramic powder, a binder (an acrylic based resin and a butyral resin, etc.), a plasticizer and an organic solvent (toluene, alcohol and MEK, etc.) is normally prepared first, then, the ceramic slurry is applied to a carrier sheet, such as PET, by using the doctor blade method, etc. and dried by heating.

Also, in recent years, a production method of preparing ceramic suspension obtained by mixing ceramic powder and a binder in a solvent, and performing 2-dimensional drawing on a film-shaped mold obtained by extrusion molding of the suspension has been studied.

A method of producing a multilayer ceramic capacitor by using the ceramic green sheet explained above will be explained specifically. An internal electrode conductive paste including metal powder and a binder is printed to be a predetermined pattern on the ceramic green sheet and dried to form an internal electrode pattern. Next, a carrier sheet is released from the ceramic green sheet, a plurality of the results are stacked and cut to be a chip shape, so that a green chip is obtained. Next, after firing the green chip, an external electrode is formed, and the multilayer ceramic capacitor is produced.

In recent years, as a use range of a multilayer ceramic capacitor increases, a small size with a large capacity has become a demand in the market. To respond thereto, an interlayer thickness of sheets formed with an internal electrode has become steadily thinner each year.

However, in the case of printing the internal electrode paste on an extremely thin ceramic green sheet, there is a disadvantage that a binder component in the ceramic green sheet is dissolved or swollen due to a solvent in the internal electrode paste. Also, there is a disadvantage that an internal electrode paste soaks in the green sheet. These disadvantages often cause a short-circuiting defect.

To eliminate the disadvantages, in the Japanese Unexamined Patent Publication Nos. 63-51616, 3-250612 and 7-312326, a dry type electrode pattern is separately prepared by forming an internal electrode pattern on a supporting sheet and drying the same. An internal electrode pattern transfer method for transferring the dry type electrode pattern to a surface of each ceramic green sheet or a surface of a multilayer body of ceramic green sheets has been proposed.

In the technique disclosed in these publications, however, particularly when a thickness of the green sheet is thin, it is extremely difficult to bond the electrode pattern layer with a surface of a green sheet to transfer with high accuracy and a ceramic green sheet is partially broken in the transfer step in some cases.

Also, in the transfer method according to these conventional techniques, since a high pressure and heat are necessary to transfer the electrode pattern layer to the surface of the green sheet, the green sheet, electrode layer and supporting sheet often deform and become unable to be used at the time of stacking, and there is a possibility of causing a short-circuiting defect due to break of the green sheet.

Note that a method of forming an adhesive layer on a surface of the electrode layer or green sheet is considered for easier transfer of the electrode layer. However, when forming an adhesive layer directly on the surface of the electrode layer or green sheet by a coating method, etc., components of the adhesive layer soak in the electrode layer or green sheet. Therefore, a function as an adhesive layer is hard to be attained, and it is liable that a composition of the electrode layer or green sheet is adversely affected.

Also, the Japanese Unexamined Patent Publication No. 2001-23853 discloses a production method of stacking multilayer blocks via an adhesive layer (adherence layer). However, in the method described in this article, a thickness of the adhesive layer is thick as 0.5 to 5 µm and it is not suitable as an adhesive layer for transferring an electrode layer to an extremely thin green sheet.

DISCLOSURE OF THE INVENTION

The present invention was made in consideration of the above circumstances and has as an object thereof to provide a production method of a multilayer electronic device, by which even an extremely thin green sheet is not damaged or deformed and a dry type electrode layer can be easily transferred to a surface of the green sheet with high accuracy at a low cost.

Another object of the present invention is to provide a production method of a multilayer electronic device, by which components of an adhesive layer do not soak in an electrode layer or green sheet, a supporting sheet can be extremely easily released and a dry type electrode layer can be easily transferred to a surface of the green sheet with high accuracy.

The present inventors have been committed themselves to study for attaining the above objects, found that the object of the present invention can be attained by forming a dry adhesive layer having a predetermined thickness on a surface of an electrode layer or green sheet, and completed the present invention.

Namely, according to a first aspect of the present invention, a production method of a multilayer electronic device comprises the steps of pressing an electrode layer against a surface of a green sheet to bond the electrode layer with the surface of the green sheet;

stacking the green sheets bonded with the electrode layer to form a green chip; and firing the green chip;

wherein before pressing the electrode layer against the surface of the green sheet, an adhesive layer having a thickness of 0.02 to 0.3 µm is formed on a surface of the electrode layer or a surface of the green sheet.

According to a second aspect of the present invention, a production method of a multilayer electronic device comprises the steps of pressing an electrode layer against a surface of a green sheet to bond the electrode layer with the surface of the green sheet;

stacking the green sheets bonded with the electrode layer to form a green chip; and firing the green chip;

wherein before pressing the electrode layer against the surface of the green sheet, an adhesive layer having a thinner thickness than an average particle diameter of dielectric particles included in the green sheet is formed on a surface of the electrode layer or a surface of the green sheet.

Note that, in the present invention, "pressing an electrode layer against a surface of a green sheet" has the same meaning as "pressing a green sheet against a surface of an electrode".

In the production method of a multilayer electronic device according to the first aspect and the second aspect of the present invention, an adhesive layer is formed on a surface of an electrode layer or green sheet and the electrode layer is bonded with a surface of the green sheet via the adhesive layer. By forming an adhesive layer, a high pressure and heat become unnecessary at the time of bonding the electrode layer with a surface of the green sheet to transfer, so that bonding at a lower pressure and lower temperature becomes possible. Accordingly, even when the green sheet is extremely thin, the green sheet is not damaged, a green sheet having an internal electrode can be preferably stacked, and short-circuiting defect, etc. are not caused.

Note that when a thickness of the adhesive layer is too thin, a thickness of the adhesive layer becomes thinner than asperity on the green sheet surface, and adhesiveness tends to decline remarkably. While, when a thickness of the adhesive layer is too thick, depending on the thickness of the adhesive layer, spaces easily arise inside an element body after sintering and capacitance tends to decline remarkably by an amount of the volume. Also, when forming a thicker adhesive layer than an average particle diameter of dielectric particles included in the green sheet, depending on the thickness of the adhesive layer, spaces easily arise inside an element body after sintering and capacitance tends to decline remarkably by an amount of the volume.

Preferably, a thickness of the green sheet is 3 μm or thinner, and a thickness of the adhesive layer is ⅕ of the thickness of the green sheet or thinner. An effect of the present invention is particularly large when the thickness of the green sheet is 3 μm or thinner.

Preferably, the green sheet includes dielectric particles containing barium titanate as its main component, and an average particle diameter of the dielectric particles is 0.4 μm or smaller. When the average particle diameter of the dielectric particles is too large, formation of a thin green sheet tends to become difficult.

Preferably, the green sheet includes an acrylic resin and/or a butyral based resin as a binder. When forming a thin green sheet by using a binder as such, a green sheet having sufficient strength can be formed even if it is thin.

Preferably, the adhesive layer includes substantially the same organic polymer material as that in a binder included in the green sheet. It is to remove the binder from the chip by binder removal processing under the same condition when performing binder removal processing.

Preferably, the adhesive layer includes a plasticizer, and the plasticizer is at least one of phthalate ester, glycol, adipic acid and phosphoric ester. As a result of including this kind of plasticizer by a predetermined amount, preferable adhesiveness can be obtained.

Preferably, the adhesive layer includes an antistatic agent, the antistatic agent is an imidazoline based surfactant, and a weight based adding quantity of the antistatic agent is not larger than that of the organic polymer material. As a result of including this kind of antistatic by a predetermined amount, preferable antistatic effect can be obtained.

The adhesive layer may include dielectric particles, and the dielectric particles have an average particle diameter equivalent to or smaller than that of dielectric particles included in the green sheet and has substantially the same kind of dielectric composition as that included in the green sheet. The adhesive layer becomes a part of an element body after firing, so that it is preferable that substantially the same kind of dielectric particles are included as that included in the green sheet is included.

Note that since it is necessary to control a thickness of the adhesive layer, an average particle diameter of the dielectric particles is preferably equivalent or smaller.

Preferably, a weight based adding ratio of dielectric particles included in the adhesive layer is lower than that of dielectric particles included in the green sheet. It is to maintain preferable adhesiveness of the adhesive layer.

Preferably, processing of bonding the electrode layer with a surface of the green sheet and bonding another green sheet with a surface of the green sheet formed with the electrode layer is repeatedly performed to form a multilayer block, wherein a plurality of the green sheets are stacked via the electrode layers; and a plurality of the multilayer blocks are stacked via the adhesive layers to form the green chip.

Due to the stacking as above, it is possible to easily produce a green chip, wherein, for example, 500 or more green sheets are stacked.

In the present invention, at the time of forming a multilayer block, a step of bonding an electrode layer with a surface of a green sheet without using an adhesive layer and bonding another green sheet with a surface of the green sheet formed with the electrode layer may be repeated to form a multilayer block. Then, a plurality of multilayer blocks may be stacked via an adhesive layer of 0.02 to 0.3 μm to form a green chip.

In the present invention, the adhesive layer may be formed by a normal coating method, etc., but is preferably formed by a transfer method. Preferably, the adhesive layer is formed on a surface of a supporting sheet in a releasable way first and pressed against a surface of the green sheet or a surface of the electrode layer to be transferred.

By not forming an adhesive layer directly on a surface of an electrode layer or green sheet by a coating method, etc., but by forming by a transfer method, components of the adhesive layer do not soak in the electrode layer or green sheet and an extremely thin adhesive layer can be formed. For example, a thickness of the adhesive layer can be made thin as 0.02 to 0.3 μm or so. Even when the thickness of the adhesive layer is thin, components of the adhesive layer do not soak in the electrode layer or green sheet, so that it has a sufficient adhesive force and does not adversely affect a composition of the electrode layer or green sheet.

Preferably, the electrode layer is formed to be a predetermined pattern on a surface of a supporting sheet via a release layer, a surface of the release layer not formed with the electrode layer is formed with a blank pattern layer having substantially the same thickness as that of the electrode layer, and the blank pattern layer is composed of substantially the same material as that of the green sheet.

By forming a blank pattern layer, a level difference on the surface due to an electrode layer having a predetermined pattern can be eliminated. Therefore, even if a pressure is applied before firing after stacking a large number of green sheets, an outer surface of a stacked body remains flat, positional deviation in the plane direction of the electrode layer is not caused, moreover, green sheet is not staved in to cause short-circuiting.

Preferably, the release layer includes substantially the same dielectric as that composing the green sheet. In that case, even if the release layer adheres to the surface of the electrode layer to remain, the remaining release layer does not cause any problem. It is because the remaining release layer is sufficiently thin comparing with the green sheet and includes the same dielectric as that composing the green sheet, so that it becomes a part of the dielectric layer as the green sheet if stacked with the green sheet and fired together.

Also, for example, by making an adhesive force of the adhesive layer stronger than that of the release layer and making an adhesive force of the release layer stronger than that of the green sheet and supporting sheet, the supporting sheet on the green sheet side can be selectively released easily.

Also, the release layer, adhesive layer, electrode layer and green sheet may include a plasticizer with a binder resin, and the plasticizer is included preferably by 25 to 100 parts by weight with respect to 100 parts by weight of the binder resin.

In the present invention, preferably, a content ratio of a binder with respect to dielectrics included in the release layer is equal to or lower than that of a binder with respect to dielectrics included in the green sheet. Preferably, a content ratio of a release agent with respect to dielectrics included in the release layer is higher than that of the release layer with respect to dielectrics included in the green sheet.

By attaining such a blending quantity, even in the case of an extremely thin and brittle green sheet, strength of the release layer becomes weaker than breaking strength of the green sheet. Therefore, at the time of transferring the electrode layer, the green sheet does not break, the release layer is partially broken or preferably released from the electrode layer, and the electrode layer is preferably transferred to the green sheet.

Preferably, a thickness of the release layer is thinner than that of the electrode layer. The thickness of the release layer is set to be preferably 60% or less and more preferably 30% or less of a thickness of the electrode layer. The lower limit of the release layer thickness is determined by a particle diameter, etc. of a dielectric material able to be used for the release layer and is preferably 0.05 to 0.3 μm.

Preferably, a pressure at the time of bonding the electrode layer with a surface of the green sheet is 0.2 to 15 MPa. Also, the temperature at pressing is preferably 40 to 100° C. or so.

When the pressuring temperature is too low, it is liable that transfer becomes difficult, while when too high, it is liable that thermal deformation arises on the supporting sheet and it becomes difficult to transfer an electrode layer having a predetermined pattern to a green sheet with high accuracy. Also, when a pressuring force is too small, it is liable that transfer becomes difficult, while when too large, possibility of breaking the green sheet becomes high and unfavorable. Particularly, when a thickness of the green sheet is thin, it is preferable that the electrode layer can be bonded with a surface of the green sheet with a small pressuring force. Note that pressuring by a pair of rolls is preferable.

In the present invention, preferably, the electrode layer is formed on a surface of the release layer by a thick film method using an electrode paste. The thick film method is not particularly limited and a screen printing, etc. may be mentioned. Note that the film may be formed by a thin film method on the surface of the release layer. The thin film method is not particularly limited and the sputtering method, the vacuum evaporation method and the CVD method, etc. may be mentioned.

When forming an electrode layer by the thin film methods, a binder and plasticizer component evaporate in vacuum and the release layer on the surface of the first supporting sheet is damaged by sputtering particles and evaporated particles. However, this affects to reduce the release layer strength, so that it is preferable for transferring the electrode layer to the surface of the green sheet.

Note that, in the present invention, a material and a production method, etc. of the green sheet are not particularly limited, and a ceramic green sheet formed by the doctor blade method, die-coating method and wire bar coating method, etc. and a porous ceramic green sheet obtained by performing 2-dimensional drawing on a film formed by extrusion molding may be used.

Also, in the present invention, a concept of an electrode layer includes an electrode paste film to be an internal electrode layer after firing.

BRIEF DESCRIPTION OF DRAWINGS

Below, the present invention will be explained in detail based on embodiments shown in drawings, wherein.

BEST MODE FOR CARRYING OUT THE INVENTION

First, as an embodiment of an electronic device produced by a method according to the present invention, an overall configuration of a multilayer ceramic capacitor will be explained.

Figure 1:
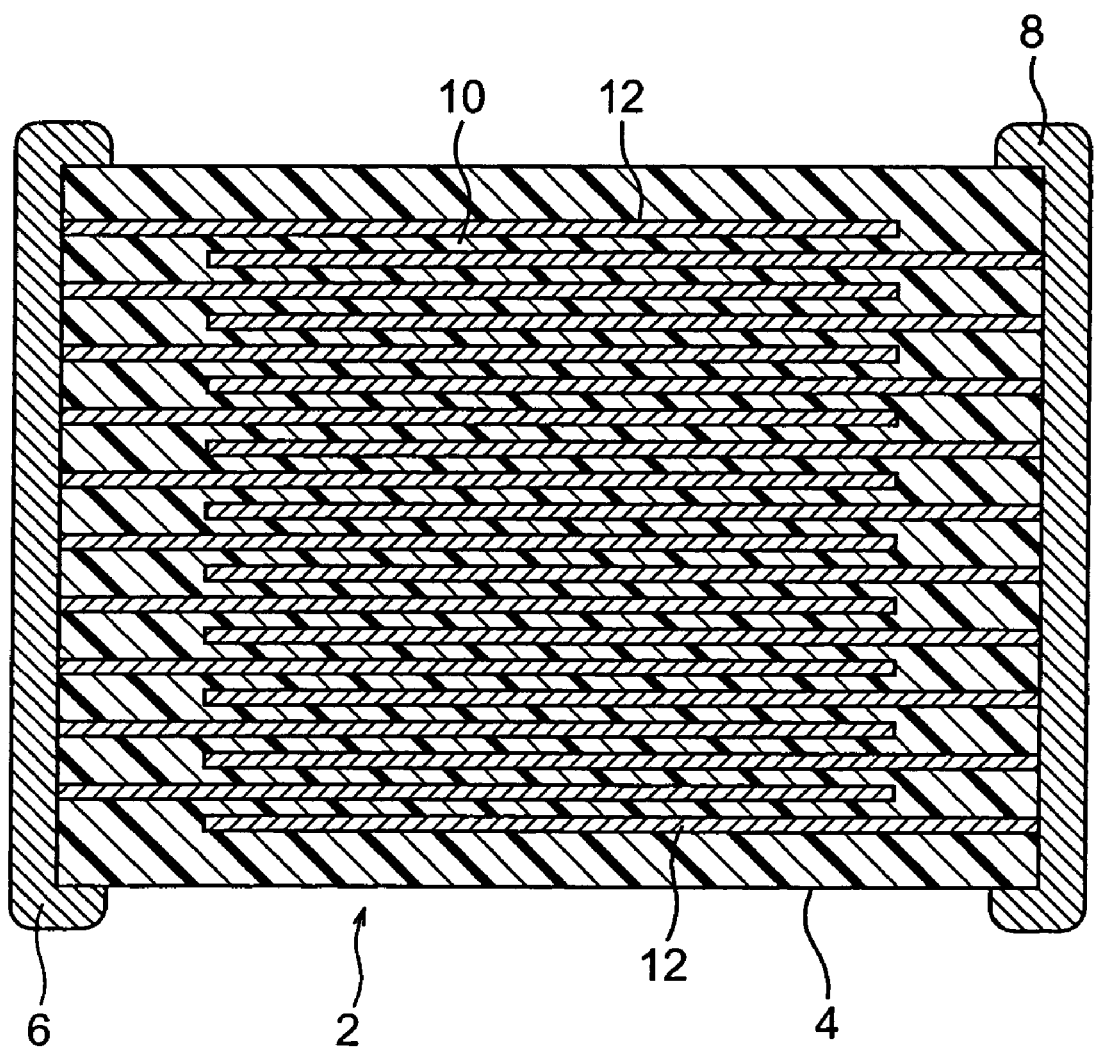
FIG. 1 is a schematic sectional view of a multilayer ceramic capacitor according to an embodiment of the present invention.

As shown in FIG. 1, a multilayer ceramic capacitor 2 according to the present embodiment comprises a capacitor element 4, a first terminal electrode 6 and a second terminal electrode 8. The capacitor element 4 has dielectric layers 10 and internal electrode layers 12, and the internal electrode layers 12 are alternately stacked between the dielectric layers 10. One side of the alternately stacked internal electrode layers 12 is electrically connected to inside the first terminal electrode 6 formed outside of a first end portion 4a of the capacitor element body 4. Also, the other side of the alternately stacked internal electrode layers 12 is electrically connected to inside of the second terminal electrode 8 formed outside of a second end portion 4b of the capacitor element body 4.

In the present embodiment, the internal electrode layer 12 is formed by transferring an electrode layer 12a to a ceramic green sheet 10a as shown in FIG. 2 to FIG. 6, which will be explained later on.

A material of the dielectric layer 10 is not particularly limited and formed by a dielectric material, such as calcium titanate, strontium titanate and/or barium titanate. A thickness of each dielectric layer 10 is not particularly limited but generally several μm to several hundreds of μm. Particularly, in the present embodiment, the layer is made thin as preferably 5 μm or thinner and more preferably 3 μm or thinner.

Also, a material of the terminal electrodes 6 and 8 is not particularly limited and normally copper, a copper alloy, nickel and nickel alloy, etc. are normally used and silver or silver alloy with palladium, etc. can be also used. Also, a thickness of the terminal electrodes 6 and 8 is not particularly limited and is normally 10 to 50 μm or so.

A shape and size of the multilayer ceramic capacitor 2 may be suitably determined in accordance with the use object. When the multilayer ceramic capacitor 2 is rectangular parallelepiped, it is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of a production method of the multilayer ceramic capacitor 2 according to the present embodiment will be explained.

(1) First, a dielectric paste is prepared to produce a ceramic green sheet to compose the dielectric layer 10 shown in FIG. 1 after firing.

The dielectric paste is normally composed of an organic solvent based paste obtained by kneading a dielectric material with an organic vehicle, or a water based paste.

The dielectric material may be suitably selected from a variety of compounds to be a composite oxide or oxide, such as carbonate, nitrate, hydroxide and organic metal compound, and mixed to be used. The dielectric material is normally used as particles having an average particle diameter of 0.4 μm or smaller, preferably 0.1 to 3.0 μm or so. Note that it is preferable to use finer powder than a green sheet thickness to form an extremely thin green sheet.

The organic vehicle is obtained by dissolving a binder in an organic solvent. The binder used for the organic vehicle is not particularly limited and a variety of normal binders, such as ethyl cellulose, polyvinyl butyral, and an acrylic resin. Preferably, polyvinyl butyral and other butyral based resin are used.

Also, the organic solvent to be used for the organic vehicle is not particularly limited and an organic solvent, such as terpineol, alcohol, butyl carbitol, acetone and toluene, is used. Also, the vehicle in the water based paste is obtained by dissolving a water-soluble binder in water. The water-soluble binder is not particularly limited and polyvinyl alcohol, methyl cellulose, hydroxyl ethyl cellulose, a water-soluble acrylic resin, and emulsion, may be used. A content of each component in the dielectric paste is not particularly limited and may be a normal content, for example, the binder by 1 to 5 wt % or so and the solvent (or water) by 10 to 50 wt % or so.

The dielectric paste may include additives selected from a variety of dispersants, plasticizers, dielectrics, glass flits and insulators. Note that a total content of these is preferably 10 wt % or smaller. When using a butyral based resin as a binder resin, a content of a plasticizer is preferably 25 to 100 parts by weight with respect to 100 parts by weight of the binder resin. When the plasticizer is too little, the green sheet tends to become brittle, while when too much, the plasticizer exudes to decline the handlability.

Figure 3A:
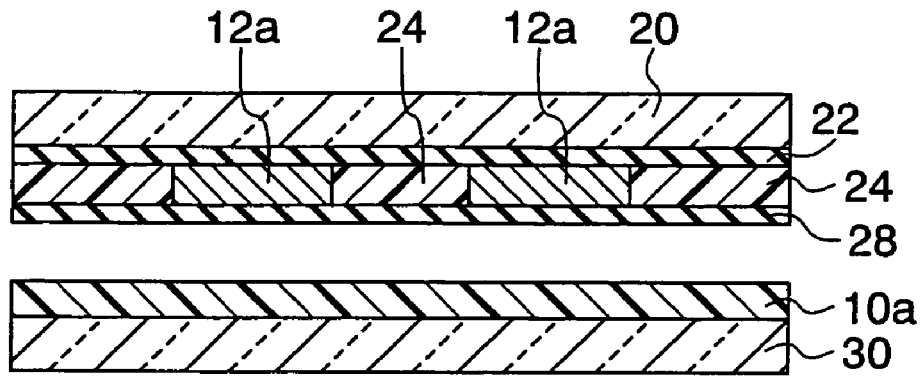

By using the dielectric paste, a green sheet 10a is formed to be a thickness of preferably 0.5 to 30 μm, and more preferably 0.5 to 10 μm or so on a carrier sheet 30 as a second supporting sheet as shown in FIG. 3A by the doctor blade method, etc. The green sheet 10a is dried after being formed on the carrier sheet 30. The drying temperature of the green sheet 10a is preferably 50 to 100° C. and the drying time is preferably 1 to 20 minutes. A thickness of the green sheet 10a after drying is reduced to 5 to 25% of a thickness before drying. The thickness of the green sheet after drying is preferably 3 μm or thinner.

Figure 2A:
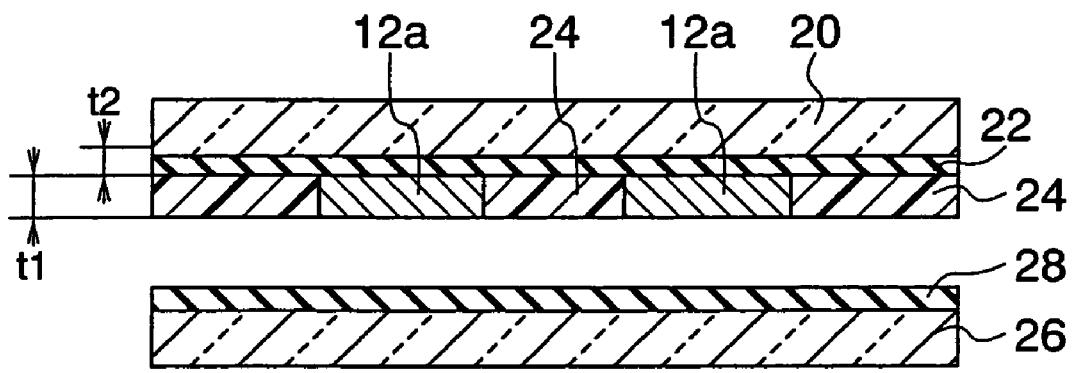
FIG. 2A to FIG. 2C and FIG. 3A to FIG. 3C are sectional views of a key part showing a transfer method of an electrode layer.

(2) A carrier sheet 20 as a first supporting sheet is prepared separately from the above carrier sheet 30 as shown in FIG. 2A, a release layer 22 is formed thereon, an electrode layer 12a having a predetermined pattern is formed thereon, and adjacent thereto, a blank pattern layer 24 having substantially the same thickness as that of the electrode layer 12a is formed on a surface of the release layer 22 not formed with the electrode layer 12a.

As the carrier sheets 20 and 30, for example, a PET film, etc. is used, which is preferably coated with silicon, etc. to improve the releasability. A thickness of the carrier sheets 20 and 30 is not particularly limited and preferably 5 to 100 μm. Thicknesses of the carrier sheets 20 and 30 may be the same or different.

The release layer 22 preferably includes the same dielectric particles as that in the dielectrics composing the green sheet 10a shown in FIG. 3A. Also, the release layer 22 includes a binder, plasticizer and release agent other than the dielectric particles. A particle diameter of the dielectric particles may be the same as that of the dielectric particles included in the green sheet, but is preferably smaller.

In the present embodiment, a thickness t2 of the release layer 22 is preferably thinner than a thickness of the electrode layer 12a and is set to have a thickness of preferably 60% or less, and more preferably 30% or less.

The coating method of the release layer 22 is not particularly limited but a coating method using, for example, a wire bar coater or a die coater is preferable because it is necessary to form it extremely thin. Note that adjustment of the thickness of the release layer can be made by selecting a wire bar coater having a different wire diameter. Namely, to make the thickness of the release layer to be applied thinner, it can be done by selecting one having a small wire diameter, inversely, to form it thick, one with a large wire diameter may be selected. The release layer 22 is dried after being applied. The drying temperature is preferably 50 to 100° C. and the drying time is preferably 1 to 10 minutes.

A binder for the release layer 22 is composed, for example, of an acrylic resin, polyvinyl butyral, polyvinyl acetal, polyvinyl alcohol, polyolefin, polyurethane, polystyrene, or an organic composed of a copolymer of these or emulsion. The binder contained in the release layer 22 may be the same as the binder contained in the green sheet 10a or may be different from that, but preferably the same.

A plasticizer for the release layer 22 is not particularly limited and, for example, phthalate ester, adipic acid, phosphate ester and glycols, etc. may be mentioned. The plasticizer to be contained in the release layer 22 may be the same as that contained in the green sheet 10a or may be different from that.

A release agent for the release layer 22 is not particularly limited and, for example, paraffin, wax and silicone oil, etc. may be mentioned. A release agent contained in the release layer 22 may be the same as that contained in the green sheet 10a or may be different from that.

A binder is contained in the release layer 22 by preferably 2.5 to 200 parts by weight, more preferably 5 to 30 parts by weight, and particularly preferably 8 to 30 parts by weight or so with respect to 100 parts by weight of dielectric particle. Note that a content ratio of the binder contained in the release layer 22 is lower than that with respect to the dielectric particles included in the green sheet 10a and is preferably 10 to 50% or so thereof. It is to reduce releasing strength of the release layer 22.

A plasticizer is preferably contained in the release layer 22 by 0 to 200 parts by weight, preferably 20 to 200 parts by weight, and more preferably 50 to 100 parts by weight with respect to 100 parts by weight of the binder. Note that a content ratio of the plasticizer with respect to the binder included in the release layer 22 is higher than that with respect to the binder included in the green sheet 10a and is preferably 10 to 100% or so thereof. It is to reduce releasing strength of the release layer 22.

A release agent is preferably contained in the release layer 22 by 0 to 100 parts by weight, preferably 2 to 50 parts by weight, and more preferably 5 to 20 parts by weight with respect to 100 parts by weight of the binder. Note that a content ratio of the release agent with respect to the binder included in the release layer 22 is higher than that with respect to the binder included in the green sheet 10a and is preferably 10 to 400% or so thereof. It is to reduce releasing strength of the release layer 22.

After forming the release layer 22 on the surface of the carrier sheet 30, as shown in FIG. 2A, an electrode layer 12a to compose an internal electrode layer 12 after firing is formed to be a predetermined pattern on the surface of the release layer 22. A thickness of the electrode layer 12a is preferably 0.1 to 2 μm, and more preferably 0.1 to 1.0 μm or so. The electrode layer 12a may be configured by a single layer or two or more layers having different compositions.

The electrode layer 12a can be formed on the surface of the release layer 22 by a thick film formation method, such as a printing method using an electrode paste, or a thin film method, such as evaporation and sputtering. When forming the electrode layer 12a on the surface of the release layer 22 by a screen printing method or a gravure printing method as a kind of thick film method, it is as follows.

First, an electrode paste is prepared. The electrode paste is fabricated by kneading a conductive material composed of a variety of conductive metals and alloys, or a variety of oxides, organic metal compounds or resinates, etc. to be conductive materials after firing, with an organic vehicle.

As a conductive material to be used when producing the electrode paste, Ni, a Ni alloy and a mixture of these are used. A shape of the conductive materials is not particularly limited and may be a spherical shape and scale-like shape, etc. or a mixture of these shapes. Those having an average particle diameter of the conductive material of normally 0.1 to 2 μm, and preferably 0.2 to 1 μm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. Particularly, butyrals, such as polyvinyl butyral, are preferable.

The binder is contained in the electrode paste by preferably 8 to 20 parts by weight with respect to 100 parts by weight of the conductive material (metal powder). As a solvent, any of well-known ones, such as terpineol, butylcarbitol and kerosene, may be used. A content of the solvent is preferably 20 to 55 wt % or so with respect to the entire paste.

To improve the adhesiveness, the electrode paste preferably contains a plasticizer. As a plasticizer, benzylbutyl phthalate (BBP) and other phthalate esters, adipic acids, phosphoric esters, and glycols, etc. may be mentioned. The plasticizer in the electrode paste is preferably 10 to 300 parts by weight, and more preferably 10 to 200 parts by weight with respect to 100 parts by weight of the binder. Note that when an adding quantity of the plasticizer or adhesive is too large, it is liable that strength of the electrode layer 12a remarkably declines. Also, to improve transferability of the electrode layer 12a, it is preferable to improve adhesiveness and/or adherence of the electrode paste by adding a plasticizer and/or adhesive to the electrode paste.

After or before forming the electrode paste layer having a predetermined pattern on the surface of the release layer 22 by a printing method, a blank pattern layer 24 is formed to be substantially the same thickness as that of the electrode layer 12a on the surface of the release layer 22 not formed with the electrode layer 12a. The blank pattern layer 24 is composed of the same material as that of the green sheet 10a shown in FIG. 3A and formed by the same method. The electrode layer 12a and the blank pattern layer 24 are dried in accordance with need. The drying temperature is not particularly limited, but is preferably 70 to 120° C., and the drying time is preferably 5 to 15 minutes.

(3) As shown in FIG. 2A, an adhesive layer transfer sheet formed with an adhesive layer 28 is prepared on the surface of a carrier sheet 26 as a third supporting sheet separately from the carrier sheets 20 and 30 explained above. The carrier sheet 26 is formed by the same sheet as that of the carrier sheets 20 and 30.

A composition of the adhesive layer 28 is the same as that of the release layer 22 except for not containing a release agent. Namely, the adhesive layer 28 contains a binder and a plasticizer. The adhesive layer 28 may contain the same dielectric particle as that of the dielectrics composing the green sheet 10a, however, in the case of forming an adhesive layer having a thinner thickness than a particle diameter of the dielectric particles, it is better not to contain dielectric particles. Also, when dielectric particles are contained in the adhesive layer 28, a particle diameter of the dielectric particles is preferably smaller than the particle diameter of the dielectric particles contained in the green sheet.

A plasticizer is preferably contained in the adhesive layer 28 by 0 to 200 parts by weight, preferably 20 to 200 parts by weight, and more preferably 50 to 100 parts by weight with respect to 100 parts by weight of the binder.

The adhesive layer 28 further contains an antistatic agent, and the antistatic agent includes one of imidazoline based surfactants, and a weight based adding quantity of the antistatic agent is preferably not larger than that of the binder (organic polymer material). Namely, the antistatic agent is preferably contained in the adhesive layer 28 by 0 to 200 parts by weight, preferably 20 to 200 parts by weight, and more preferably 50 to 100 parts by weight with respect to 100 parts by weight of the binder.

A thickness of the adhesive layer 28 is preferably 0.02 to 0.3 μm or so, more preferably, thinner than an average particle diameter of dielectric particles contained in the green sheet. Also, a thickness of the adhesive layer 28 is preferably ⅕ or of a thickness of the green sheet 10a or thinner.

When a thickness of the adhesive layer 28 is too thin, the adhesive force declines, while when too thick, spaces are easily formed inside an element body after sintering depending on the thickness of the adhesive layer, and a capacitance by an amount of the volume tends to decrease remarkably.

The adhesive layer 28 is formed on the surface of the carrier sheet 26 as a third supporting sheet, for example, by a bar coater method, die coater method, reverse coater method, dip coater method and kiss coater method, etc. and dried in accordance with need. The drying temperature is not particularly limited, but is preferably the room temperature to 80° C., and the drying time is preferably 1 to 5 minutes.

Figure 2B:
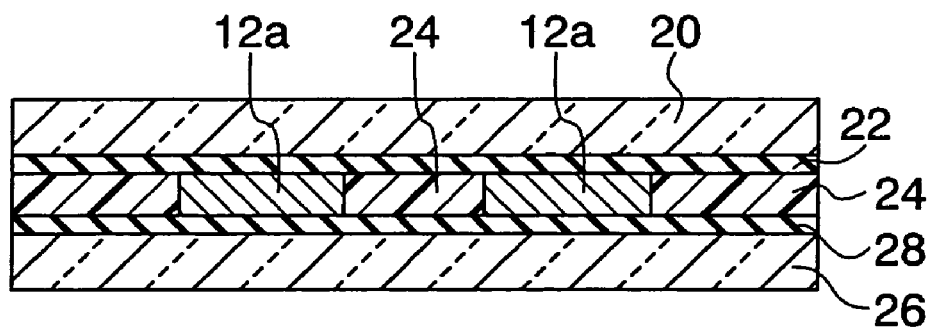
Figure 2C:
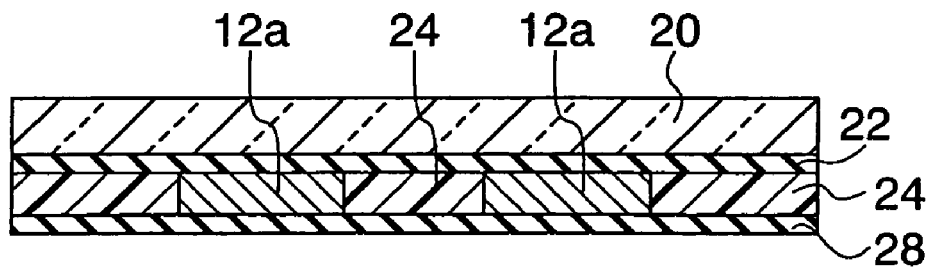

(4) To form the adhesive layer on the surface of the electrode layer 12a and the blank pattern layer 24 shown in FIG. 2A, a transfer method is applied in the present embodiment. Namely, as shown in FIG. 2B, the adhesive layer 28 of the carrier sheet 26 is pressed against the surface of the electrode layer 12a and the blank pattern layer 24, heated and pressed, then, the carrier sheet 26 is removed. Consequently, as shown in FIG. 2C, the adhesive layer 28 is transferred to the surface of the electrode layer 12a and the blank pattern layer 24. Note that transfer of the adhesive layer 28 may be performed on the surface of the green sheet 10a shown in FIG. 3A.

The heating temperature at transferring is preferably 40 to 100° C., and the pressing force is preferably 0.2 to 15 MPa. Pressing may be performed by a press or a calendar roll, but is preferably performed by a pair of rolls.

Figure 3B:
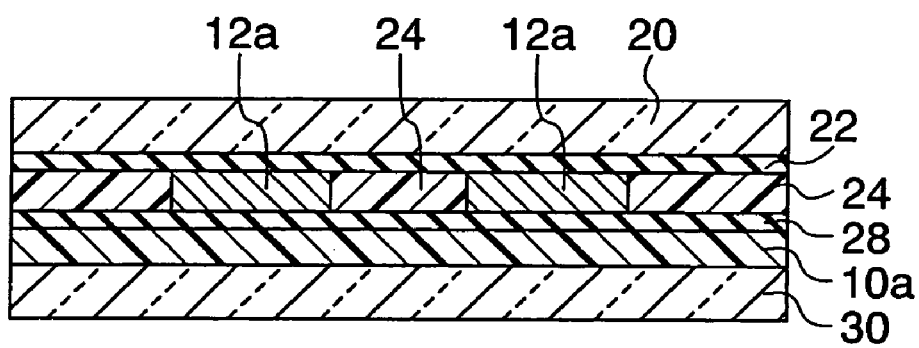
Figure 3C:
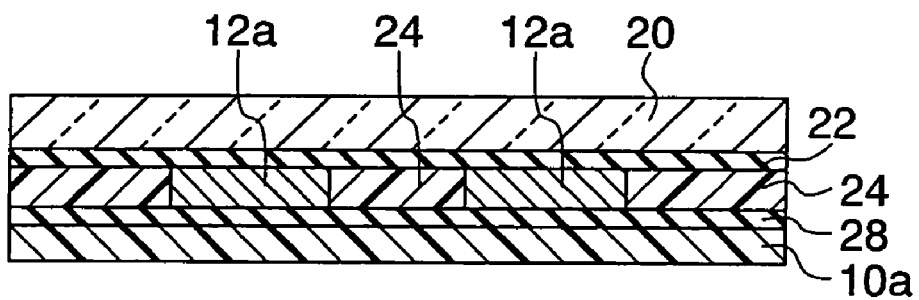

After that, the electrode layer 12a is bonded with the surface of the green sheet 10a formed on the surface of the carrier sheet 30 shown in FIG. 3A. For that purpose, as shown in FIG. 3B, the electrode layer 12a and the blank pattern layer 24 of the carrier sheet 20 are pressed against the surface of the green sheet 10a together with the carrier sheet 20 via the adhesive layer 28, heated and pressed. As a result, as shown in FIG. 3C, the electrode layer 12a and the blank pattern layer 24 are transferred to the surface of the green sheet 10a. Note that since the carrier sheet 30 on the green sheet side is peeled off, when seeing from the green sheet 10a side, the green sheet 10a is transferred to the electrode layer 12a and the blank pattern layer 24 via the adhesive layer 28.

Heating and pressing at the time of transferring may be pressing and heating by a press or by a calendar roll, but is preferably performed by a pair of rolls. The heating temperature and the pressing force are same as those at the time of transferring the adhesive layer 28.

A single-layer electrode layer 12a having a predetermined pattern is formed on the single green sheet 10a by steps shown in FIG. 2A to FIG. 3C. A green sheet 10a formed with the electrode layer 12a is stacked, for example, by repeating the steps shown in FIG. 4A to FIG. 6C. Note that, in FIG. 4A to FIG. 6C, the same reference numbers are given to common members with those shown in FIG. 3A to FIG. 4C, and an explanation thereon is partially omitted.

Figure 4A:
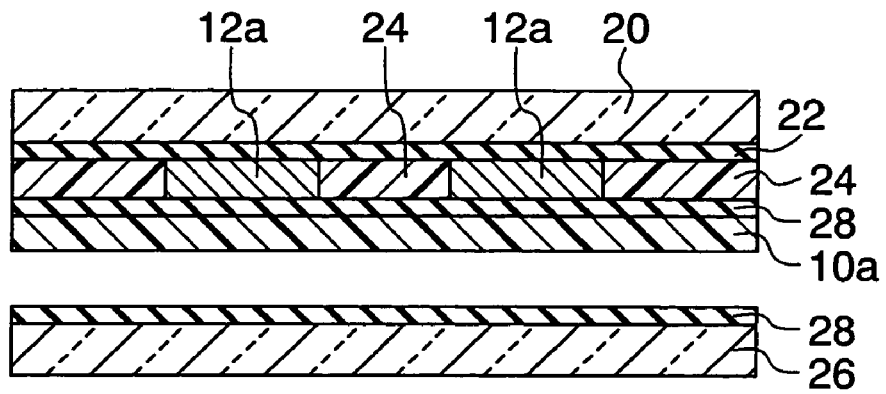
FIG. 4A to FIG. 4C, FIG. 5A to FIG. 5C, FIG. 6A to FIG. 6C, FIG. 7 and FIG. 8 are sectional views of a key part showing a stacking method of a green sheet bonded with an electrode layer.
Figure 4B:
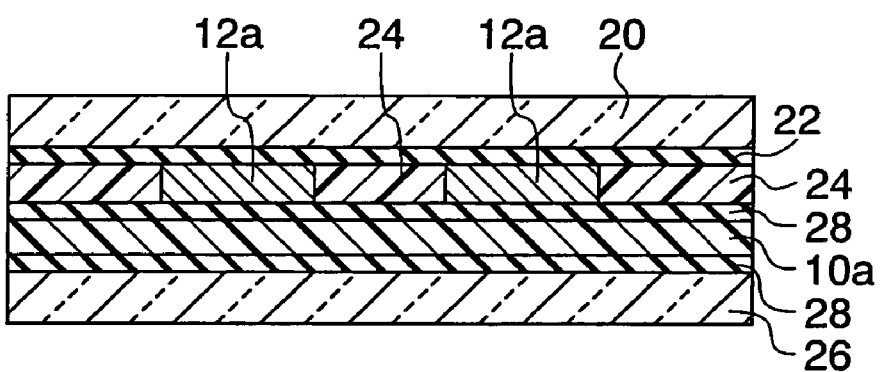
Figure 4C:
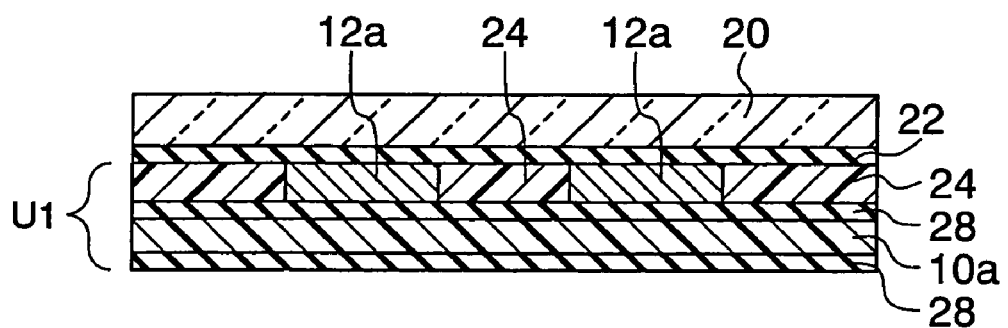
Figure 5A:
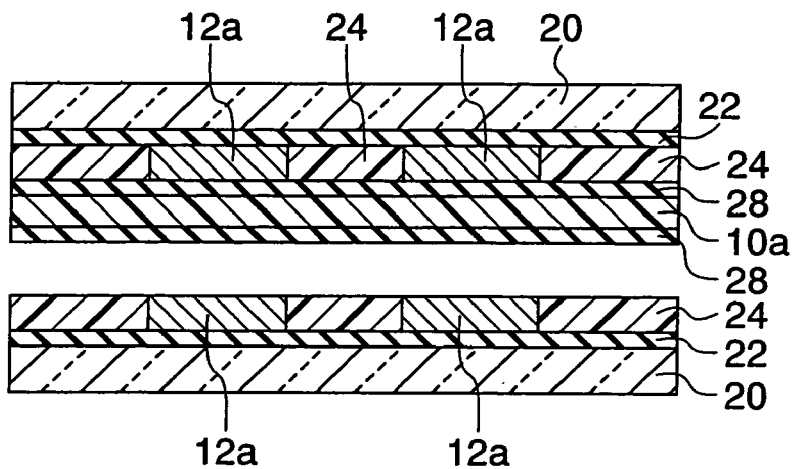

First, as shown in FIG. 4A to FIG. 4C, the adhesive layer 28 is transferred to the surface on the other side of the electrode layer (back side) on the green sheet 10a. After that, as shown in FIG. 5A to FIG. 5C, the electrode layer 12a and the blank pattern layer 24 are transferred to the back side of the green sheet 10a via the adhesive layer 28.

Figure 6A:
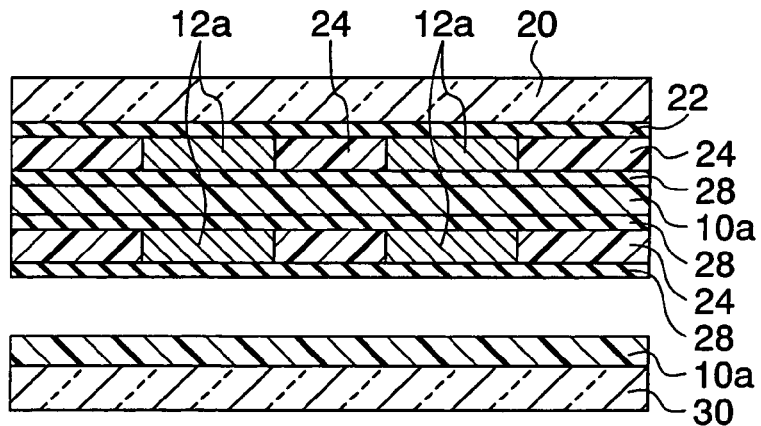
Figure 6B:
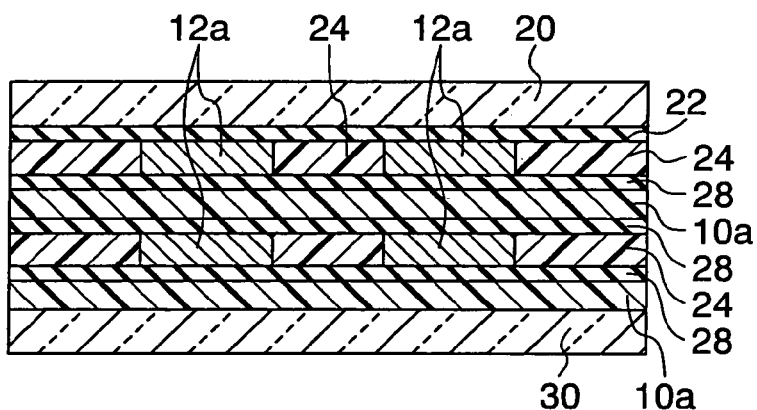
Figure 6C:
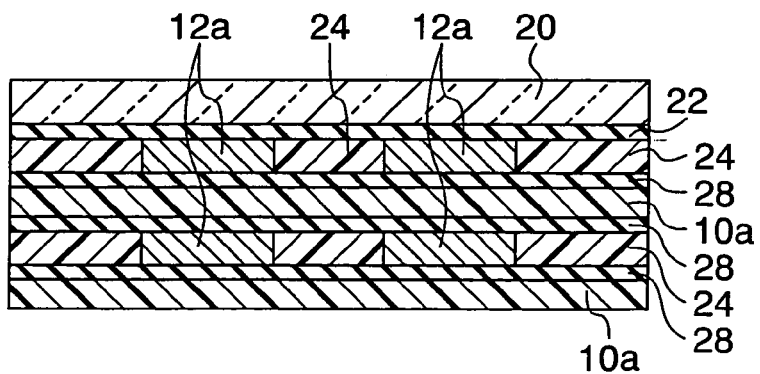
Figure 7:
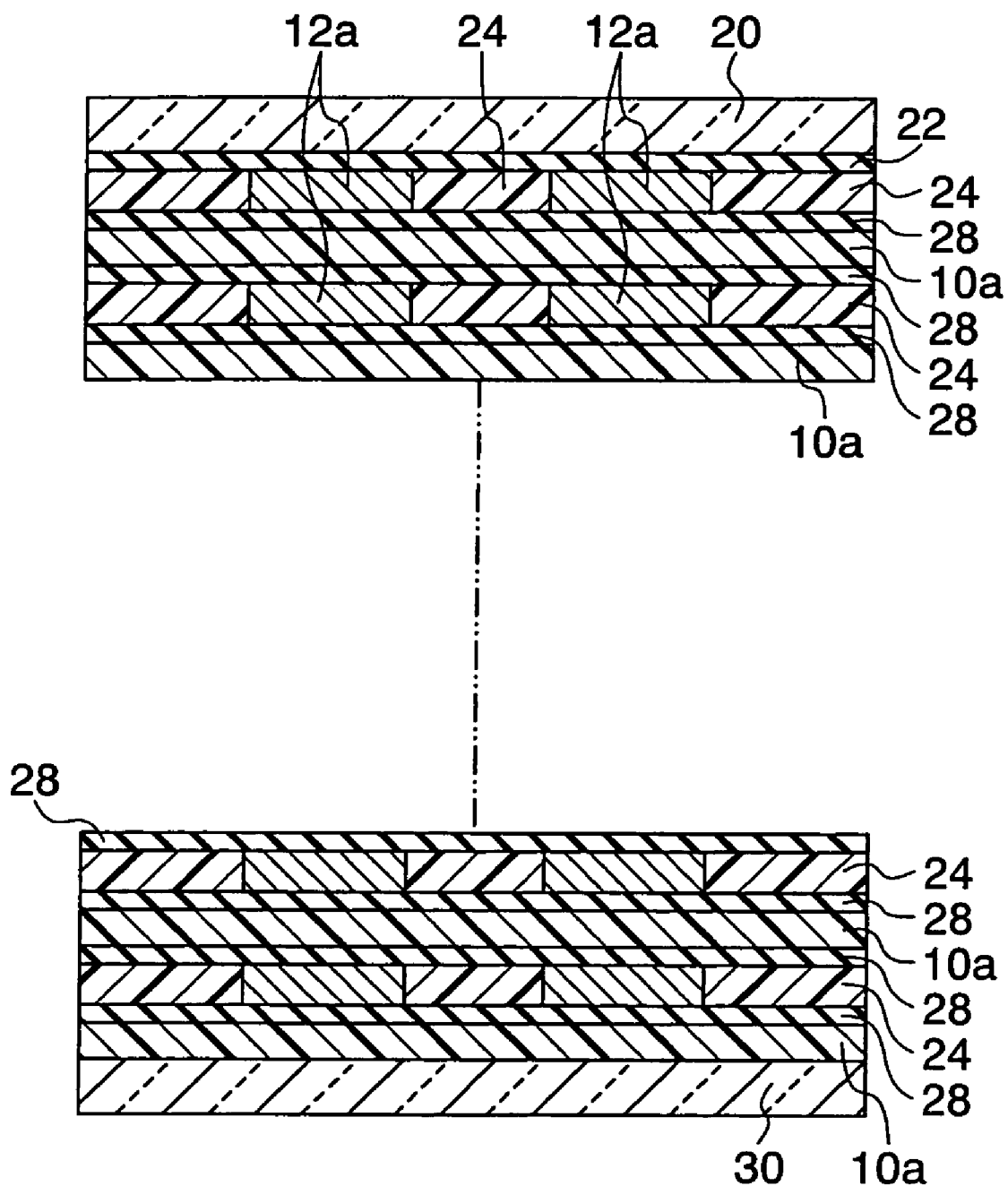

Next, as shown in FIG. 6A to FIG. 6C, on the surface of the electrode layer 12a and the blank pattern layer 24, the green sheet 10a is transferred via the adhesive layer 28. After that, by repeating the transfer, a multilayer block, wherein a large number of electrode layers 12a and the green sheet 10a are alternately stacked as shown in FIG. 7, is obtained.

Figure 5B:
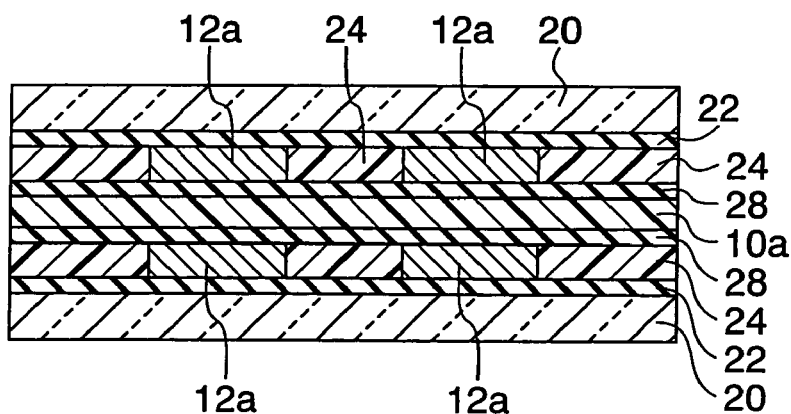
Figure 5C:
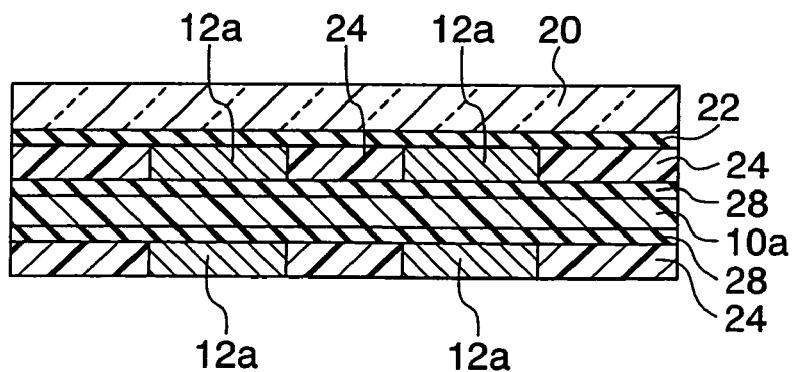

Note that, without applying the steps shown in FIG. 5C to FIG. 6C, from the step shown in FIG. 5B, the carrier sheet on the upper side may be removed instead of removing the carrier sheet 20 on the lower side and a multilayer unit U1 shown in FIG. 4C may be stacked thereon. After that, by repeating an operation of removing the carrier sheet 20 on the upper side again, stacking thereon the multilayer unit U1 shown in FIG. 4C, and removing the carrier sheet 20 on the upper side, a multilayer block, wherein a large number of electrode layers 12a and the green sheet 10a are alternately stacked as shown in FIG. 7, is obtained. A method of stacking the multilayer unit U1 shown in FIG. 4C is superior in terms of an efficiency of the stacking operation.

When the number of stacking layers of the green sheet is small, a firing step in the next step is performed on the multilayer block alone. Also, in accordance with need, a plurality of multilayer blocks as such may be stacked via adhesive layers 28 formed by a transfer method in the same way as above to obtain a multilayer body having larger number of layers.

Figure 8:
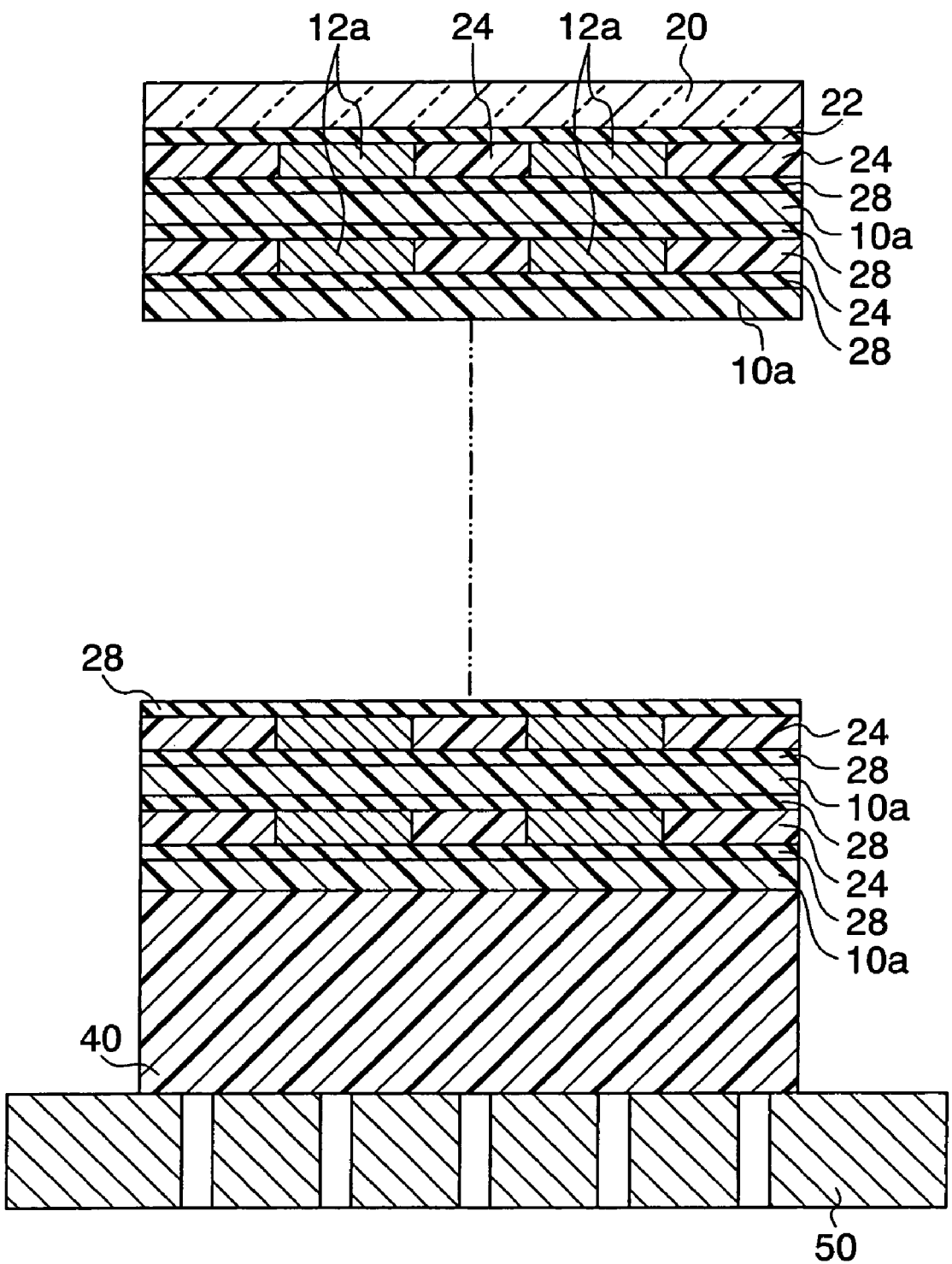

(5) After that, as shown in FIG. 8, a green sheet 40 for an outer layer (a thick multilayer body obtained by stacking a plurality of green sheets not formed with an electrode layer) is stacked on the lower surface of the stacked body and the entire stacked body is supported by an absorption holder 50. After that, the carrier sheet 20 on the upper side is peeled off, the outer layer green sheet 40 is formed on top of the multilayer body in the same way, and final pressing is performed.

Pressure at the time of the final pressing is preferably 10 to 200 MPa. The heating temperature is preferably 40 to 100° C. After that, the multilayer body is cut to be a predetermined size to form green chips. The green chips are subjected to binder removal processing and firing processing, then, thermal treatment is performed in order to re-oxidize the dielectric layer.

The binder removal processing may be performed under a normal condition, but when using a base metal, such as Ni and a Ni alloy, as a conductive material of the internal electrode layer, it is preferably performed under the specific condition below.

temperature rising rate: 5 to 300° C./hour, particularly 10 to 50° C./hour holding temperature: 200 to 400° C., particularly 250 to 350° C.

holding time: 0.5 to 20 hours, particularly 1 to 10 hours atmosphere: a wet mixed gas of $N_2$ and $H_2$ A firing condition is preferably as below.

temperature rising rate: 50 to 500° C./hour, particularly 200 to 300° C./hour holding temperature: 1100 to 1300° C., particularly 1150 to 1250° C.

holding time: 0.5 to 8 hours, particularly 1 to 3 hours cooling rate: 50 to 500° C./hour, particularly 200 to 300° C./hour atmosphere gas: a wet mixed gas of $N_2$ and $H_2$, etc.

Note that oxygen partial pressure in an atmosphere in the air at firing is preferably $10^{-2}$ Pa or lower, particularly $10^{-2}$ to $10^{-8}$ Pa. When exceeding the above ranges, the internal electrode layer tends to oxidize, while when the oxygen partial pressure is too low, abnormal sintering is caused in an electrode material of the internal electrode layer to be broken.

The thermal treatment after performing such firing is preferably performed with a holding temperature or highest temperature of 1000° C. or higher, more preferably 1000 to 1100° C. When the holding temperature or the highest temperature at the time of the thermal treatment is lower than the above ranges, it is liable that oxidization of the dielectric material is insufficient to make the insulation resistance lifetime short, while when exceeding the above ranges, Ni in the internal electrode oxidizes and the capacity decreases, moreover, Ni reacts with a dielectric base and the lifetime also tends to become short. The oxygen partial pressure at the time of thermal treatment is higher than that in a reducing atmosphere at the time of firing, preferably $10^{-3}$ Pa to 1 Pa, and more preferably $10^{-2}$ Pa to 1 Pa. When it is lower than the above range, re-oxidization of the dielectric layer 2 becomes difficult, while when exceeding the above ranges, the internal electrode layer 3 tends to oxidize. Other condition of the thermal treatment is preferably as below.

holding time: 0 to 6 hours, particularly 2 to 5 hours cooling rate: 50 to 500° C./hour, particularly 100 to 300° C./hour atmosphere gas: wet $N_2$ gas, etc.

Note that to wet a $N_2$ gas or a mixed gas, etc., for example, a wetter, etc. may be used. In this case, the water temperature is preferably 0 to 75° C. or so. Also, the binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, after raising the temperature to the holding temperature at the binder removal processing in an atmosphere of a $N_2$ gas or a wet $N_2$ gas, the atmosphere is changed, and the temperature is furthermore raised. After that, after cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode paste is burnt to form terminal electrodes 6 and 8. For example, a firing condition of the terminal electrode paste is preferably in a wet mixed gas of $N_2$ and $H_2$ at 600 to 800° C. for 10 minutes to 1 hour or so. In accordance with need, plating, etc. is performed on the terminal electrodes 6 and 8 to form a pad layer. Note that the terminal electrode paste may be fabricated in the same way as the electrode paste explained above.

A multilayer ceramic capacitor of the present invention produced as above is mounted on a print substrate, etc. by soldering, etc. and used for a variety of electronic equipments, etc.

In a method of producing a multilayer ceramic capacitor according to the present embodiment, it is possible to easily transfer a dry type electrode layer 12a to a surface of the green sheet 10a with high accuracy without breaking or deforming the green sheet 10a.

Particularly, in the production method of the present embodiment, the adhesive layer 28 is formed on the surface of the electrode layer or green sheet by the transfer method, and the electrode layer 12a is bonded with the surface of the green sheet 10a via the adhesive layer 28. By forming the adhesive layer 28, a high pressure and heat become unnecessary at the time of bonding the electrode layer 12a to transfer to the surface of the green sheet 10a, so that bonding at a lower pressure and lower temperature becomes possible. Accordingly, even in the case of an extremely thin green sheet 10a, the green sheet 10a is not broken, the electrode layers 12a and green sheets 10a can be preferably stacked, and short-circuiting defect, etc. are not caused.

Also, for example, by making an adhesive force of the adhesive layer 28 stronger than that of the release layer 22 and making an adhesive force of the release layer 22 stronger than that between the green sheet 10a and the carrier sheet 30, etc., the carrier sheet 30 on the green sheet 10a side can be selectively released easily.

Furthermore, in the present embodiment, the adhesive layer 28 is not directly formed on a surface of the electrode layer 12a or green sheet 10a by a coating method, etc. and formed by a transfer method, so that components of the adhesive layer 28 do not soak in the electrode layer 12a or green sheet 10a, and it becomes possible to form an extremely thin adhesive layer 28. For example, a thickness of the adhesive layer 28 can be made thin as 0.02 to 0.3 μm or so. Although the thickness of the adhesive layer 28 is thin, components of the adhesive layer 28 do not soak in the electrode layer 12a and green sheet 10a, the adhesive force is sufficient and a composition of the electrode layer 12a or green sheet 10a is not adversely affected.

Note that the present invention is not limited to the above embodiments and may be variously modified within the scope of the present invention.

For example, in another embodiment of the present invention, as shown in FIG. 4C, after forming a multilayer unit U1 made by the green sheet 10a, adhesive layer 28, electrode layer 12a and blank pattern layer 24, a plurality of the multilayer units U1 may be stacked and subjected to press molding by a mold, etc. to obtain a multilayer block, and the multilayer blocks may be furthermore stacked via the adhesive layer 28 to obtain a green chip. Note that when obtaining a multilayer block by stacking a plurality of multilayer units U1 shown in FIG. 4C and performing press molding by a mold, etc., the stacking may be attained without using the adhesive layer 28. Note that when stacking the multilayer blocks, it is preferable to use the adhesive layer 28.

Also, the method of the present invention is not limited to the production method of the multilayer ceramic capacitor but can be applied as a production method of other multilayer electronic device.

EXAMPLES

Below, the present invention will be explained based on further detailed examples, but the present invention is not limited to the examples.

Example 1

First, each paste below was prepared.
Green Sheet Paste (as same as Blank Pattern Paste)
Powders selected from $BaTiO_3$ powder (BT-02 made by Sakai Chemical Industry Co., Ltd.), $MgCO_3$, $MnCO_3$, $(Ba_{0.6}Ca_{0.4})SiO_3$ and rare earths ($Gd_2O_3$, $Tb_4O_7$, $Dy_2O_3$, $Ho_2O_3$, $Er_2O_3$, $Tm_2O_3$, $Yb_2O_3$, $Lu_2O_3$, and $Y_2O_3$) were wet mixed by a ball mill for 16 hours and dried to obtain a dielectric material. An average particle diameter of the material powders was 0.1 to 1 μm.

$(Ba_{0.6}Ca_{0.4})SiO_3$ was produced by wet mixing $BaCO_3$, $CaCO_3$ and $SiO_2$ by a ball mill for 16 hours, dried and fired at 1150° C. in the air, and wet grinding the result for 100 hours by a ball mill.

To make the dielectric material paste, an organic vehicle was added to the dielectric material and mixed by a ball mill and a dielectric green sheet paste was obtained. The organic vehicle has a blending ratio of 6 parts by weight of a polyvinyl butyral resin (PVB) as a binder, 3 parts by weight of bis(2-ethylhexyl)phthalate (DOP), 55 parts by weight of ethanol and 10 parts by weight of toluene as a plasticizer, and 0.5 part by weight of paraffin as a release agent with respect to 100 parts by weight of the dielectric material. Note that a content of DOP as a plasticizer becomes 50 parts by weight (PHR) when assuming that PVD is 100 parts by weight. Also, since PVB is 6 parts by weight with respect to 100 parts by weight of the dielectric material, so that it is included at a rate of 6 PHP.

Release Layer Paste

A release layer paste was obtained by diluting the above dielectric green sheet paste by ethanol/toluene (55/10) with 4 times.

Adhesive Layer Paste

As an adhesive layer paste, an organic vehicle was used. The organic vehicle was obtained by diluting a material having a blending ratio of 50 parts by weight (50 PHR) of bis(2-hethylhexyl)phthalate DOP, 1050 parts by weight of ethanol, 300 parts by weight of toluene as a plasticizer, and 10 parts by weight of paraffin as a release agent with respect to 100 parts by weight of a polyvinyl butyral resin with 5 times by a mixed solvent of 350 parts by weight of ethanol and 100 parts by weight of toluene.

Internal Electrode Paste (Electrode Layer Paste to be Transferred)

Next, an internal electrode paste was obtained by kneading a material having the blending ratio below by a three-roll to make slurry. Namely, 100 parts by weight of Ni particles having an average particle diameter of 0.4 μm were added with 40 parts by weight of an organic vehicle (obtained by dissolving 8 parts by weight of an ethyl cellulose resin as a binder in 92 parts by weight of terpineol) and 10 parts by weight of terpineol, and kneaded by a three-roll and made to be slurry, so that an internal electrode paste was obtained.

Formation of Green Sheet and Transfer of Adhesive Layer and Electrode Layer

First, by using the above-dielectric green sheet paste, a green sheet having a thickness of 0.1.0 μm was formed on a PET film (second supporting sheet) by using a wire bar coater. Next, the above release layer paste was applied to another PET film (first supporting sheet) by a wire bar coater and dried to form a release layer of 0.2 μm.

On the surface of the release layer, an electrode layer 12a and a blank pattern layer 24 were formed. The electrode layer 12a was formed to be a thickness of 1.2 μm by the printing method using the above internal electrode paste. The blank pattern layer 24 was formed to be a thickness of 1.2 μm by the printing method using the above dielectric green sheet paste.

Also, an adhesive layer 28 was formed on another PET film (third supporting sheet). The adhesive layer 28 was formed to be a thickness of 0.1 μm by using the above adhesive layer paste by a wire bar coater.

First, on the surface of the electrode layer 12a and the blank pattern layer 24, the adhesive layer 28 was transferred by the method shown in FIG. 2. At the time of transferring, a pair of rolls were used, the pressing force was 1 MPa and the temperature was 80° C. It was confirmed that the transfer was preferably performed.

Next, by the method shown in FIG. 3, the internal electrode layer 12a and the blank pattern layer 24 were bonded with (transferred to) the surface of the green sheet 10a via the adhesive layer 28. At the time of transferring, a pair of rolls were used, the pressing force was 1 MPa and the temperature was 80° C. It was confirmed that the transfer was preferably performed.

Next, by the method shown in FIG. 4 to FIG. 6, the internal electrode layers 12a and green sheets 10a were successively stacked and stacking of 5 internal electrode layers 12a was performed finally to obtain a sample of a multilayer block.

Transferring was performed respectively on 20 same samples, and a ratio (good product rate) of those without any cracks and pinholes on the transferred electrode layer and breaking on the green sheet was measured. 95% or higher was determined @, 60 to 95% was determined o, and 60% or lower was determined x. Also, binder removal processing and firing under a normal condition were performed on other same 20 samples, and existence of delamination was observed on sectional surfaces of the respective samples after firing by using an optical microscope and SEM. Namely, a ratio (good product rate) of those with no delamination observed was measured on the 20 samples, and 95% or higher was determined @, 60 to 95% was determined o and 60% or lower was determined x. The results are shown in Table 1.

TABLE 1

| | | Adhesive Layer | | | | | | | |
|---|---|---|---|---|---|---|---|---|---|
| | | Plasticizer | | | Common Material Powder | | Adhesive | Green Sheet Binder | |
| No. | Binder | Kind | Adding Quantity (PHR) | Antistatic agent | Particle Diameter (μm) | Adding Quantity (PHR) | Layer Thickness (μm) | Kind | Adding Quantity (PHR) |
| Example 1 | PVB | DOP | 50 | — | None | None | 0.1 | PVB | 6 |
| Example 2 | ↑ | ↑ | ↑ | — | ↑ | ↑ | 0.01 | ↑ | ↑ |
| Example 2 | ↑ | ↑ | ↑ | — | ↑ | ↑ | 0.02 | ↑ | ↑ |
| Example 2 | ↑ | ↑ | ↑ | — | ↑ | ↑ | 0.1 | ↑ | ↑ |
| Example 2 | ↑ | ↑ | ↑ | — | ↑ | ↑ | 0.2 | ↑ | ↑ |
| Example 2 | ↑ | ↑ | ↑ | — | ↑ | ↑ | 0.3 | ↑ | ↑ |
| Example 2 | ↑ | ↑ | ↑ | — | ↑ | ↑ | 0.5 | ↑ | ↑ |
| Example 2 | ↑ | ↑ | ↑ | — | ↑ | ↑ | 1 | ↑ | ↑ |
| Example 3 | ↑ | ↑ | ↑ | — | ↑ | ↑ | 0.1 | ↑ | ↑ |
| Example 3 | ↑ | ↑ | ↑ | — | ↑ | ↑ | 0.2 | ↑ | ↑ |
| Example 3 | ↑ | ↑ | ↑ | — | ↑ | ↑ | 0.4 | ↑ | ↑ |
| Example 3 | ↑ | ↑ | ↑ | — | ↑ | ↑ | 0.3 | ↑ | ↑ |
| Example 3 | ↑ | ↑ | ↑ | — | ↑ | ↑ | 0.6 | ↑ | ↑ |
| Example 3 | ↑ | ↑ | ↑ | — | ↑ | ↑ | 0.6 | ↑ | ↑ |
| Example 3 | ↑ | ↑ | ↑ | — | ↑ | ↑ | 1 | ↑ | ↑ |
| Example 3 | ↑ | ↑ | ↑ | — | ↑ | ↑ | 2 | ↑ | ↑ |
| Comparative Example 1 | ↑ | ↑ | ↑ | — | ↑ | ↑ | — | ↑ | ↑ |
| Comparative Example 2 | ↑ | ↑ | ↑ | — | ↑ | ↑ | — | ↑ | ↑ |
| Example 4 | ↑ | ↑ | ↑ | — | ↑ | ↑ | 0.1 | ↑ | ↑ |
| Example 4 | ↑ | ↑ | ↑ | — | ↑ | ↑ | 0.1 | ↑ | ↑ |
| Example 5 | Acryl | DOP | ↑ | — | ↑ | ↑ | 0.1 | ↑ | ↑ |

TABLE 1-continued

| Example 5 | Acryl | BBP | ↑ | — | ↑ | ↑ | 0.1 | ↑ | ↑ |
| Example 5 | Acryl | DOP | ↑ | — | ↑ | ↑ | 0.1 | Acryl | ↑ |
| Example 5 | Acryl | BBP | ↑ | — | ↑ | ↑ | 0.1 | Acryl | ↑ |
| Example 6 | PVB | BBP | ↑ | — | ↑ | ↑ | 0.1 | PVB | ↑ |
| Example 6 | ↑ | DOA | ↑ | — | ↑ | ↑ | 0.1 | ↑ | ↑ |
| Example 6 | ↑ | BPBG | ↑ | — | ↑ | ↑ | 0.1 | ↑ | ↑ |
| Example 6 | ↑ | TBP | ↑ | — | ↑ | ↑ | 0.1 | ↑ | ↑ |

| | Green Sheet | | | | | Adhesive Layer/ | Adhesive Layer/ |
| | Plasticizer | | Dielectric | | | Dielectric | Sheet |
| No. | Kind | Adding Quantity (PHR) | Sheet Thickness (μm) | Particle Diameter (μm) | Transfer-ability | Delam-ination | Particle Diameter (1 or thinner) | Sheet Thickness (0.2 or thinner) |
|---|---|---|---|---|---|---|---|---|
| Example 1 | DOP | 50 | 1 | 0.2 | ○ | ○ | 0.5 | 0.100 |
| Example 2 | ↑ | ↑ | 1.5 | 0.4 | X | — | 0.025 | 0.007 |
| Example 2 | ↑ | ↑ | 1.5 | 0.4 | ○ | ○ | 0.05 | 0.013 |
| Example 2 | ↑ | ↑ | 1.5 | 0.4 | ◎ | ◎ | 0.25 | 0.067 |
| Example 2 | ↑ | ↑ | 1.5 | 0.4 | ◎ | ◎ | 0.5 | 0.133 |
| Example 2 | ↑ | ↑ | 1.5 | 0.4 | ○ | ○ | 0.75 | 0.200 |
| Example 2 | ↑ | ↑ | 1.5 | 0.4 | ○ | X | 1.25 | 0.333 |
| Example 2 | ↑ | ↑ | 1.5 | 0.4 | ○ | X | 2.5 | 0.667 |
| Example 3 | ↑ | ↑ | 1 | 0.2 | ○ | ○ | 0.5 | 0.100 |
| Example 3 | ↑ | ↑ | 1 | 0.2 | ○ | ○ | 1 | 0.200 |
| Example 3 | ↑ | ↑ | 1 | 0.2 | ○ | X | 2 | 0.400 |
| Example 3 | ↑ | ↑ | 3 | 0.4 | ○ | ○ | 0.75 | 0.100 |
| Example 3 | ↑ | ↑ | 3 | 0.4 | ○ | X | 1.5 | 0.200 |
| Example 3 | ↑ | ↑ | 4 | 0.8 | ○ | ○ | 0.75 | 0.150 |
| Example 3 | ↑ | ↑ | 3 | 0.8 | ○ | X | 1.25 | 0.333 |
| Example 3 | ↑ | ↑ | 3 | 0.8 | ○ | X | 2.5 | 0.667 |
| Comparative Example 1 | ↑ | ↑ | 1 | 0.2 | X | — | — | — |
| Comparative Example 2 | ↑ | ↑ | 1 | 0.2 | X | — | — | — |
| Example 4 | ↑ | ↑ | 1 | 0.2 | ○ | ○ | 0.5 | 0.100 |
| Example 4 | ↑ | ↑ | 1.5 | 0.4 | ◎ | ◎ | 0.25 | 0.067 |
| Example 5 | ↑ | ↑ | 1 | 0.2 | X | — | 0.5 | 0.100 |
| Example 5 | ↑ | ↑ | 1 | 0.2 | X | — | 0.5 | 0.100 |
| Example 5 | ↑ | ↑ | 1 | 0.2 | ○ | ○ | 0.5 | 0.100 |
| Example 5 | ↑ | ↑ | 1 | 0.2 | ○ | ○ | 0.5 | 0.100 |
| Example 6 | ↑ | ↑ | 1 | 0.2 | ○ | ○ | 0.5 | 0.100 |
| Example 6 | ↑ | ↑ | 1 | 0.2 | ○ | ○ | 0.5 | 0.100 |
| Example 6 | ↑ | ↑ | 1 | 0.2 | ○ | ○ | 0.5 | 0.100 |
| Example 6 | ↑ | ↑ | 1 | 0.2 | ○ | ○ | 0.5 | 0.100 |

Example 2

Other than changing a thickness of the adhesive layer 28 in a range of 0.01 to 1.0 μm as shown in Table 1, the internal electrode layer 12*a* and the blank pattern layer 24 were bonded with (transferred to) the surface of the green sheet 10*a* in the same way as in the example 1. A test of transferability as conducted in the same way as in the example 1 and existence of delamination was observed, and the results are shown in Table 1.

As shown in Table 1, in the case of an adhesive layer having a thickness of preferably 0.02 to 0.3 μm and more preferably 0.1 to 0.2 μm, it was confirmed that the transferability was improved and delamination was not observed.

Example 3

As shown in Table 1, other than changing an average particle diameter of the dielectric particles included in the green sheet and a thickness of the adhesive layer, the internal electrode layer 12*a* and the blank pattern layer 24 were bonded with (transferred to) the surface of the green sheet 10*a* in the same way as in the example 1. A test of transferability as conducted in the same way as in the example 1 and existence of delamination was observed. The results are shown in Table 1.

As shown in Table 1, it was confirmed that by forming an adhesive layer having a thinner thickness than the average particle diameter of the dielectric particles included in the green sheet, delamination was not observed. Also, in terms of eliminating delamination, it was confirmed to be preferable that the thickness of the adhesive layer is ⅕ (0.2) of a thickness of the green sheet or thinner when the green sheet thickness is 3 μm or thinner.

Comparative Example 1

Other than not forming the adhesive layer 28, the internal electrode layer 12*a* and the blank pattern layer 24 were bonded with (transferred to) the surface of the green sheet 10*a* in the same way as in the example 1.

Transferring was not attained at all and 20 same samples came unstuck.

Comparative Example 2

Other than not forming the adhesive layer 28 and changing the pressing force to 10 MPa and the temperature to 120° C.

at the time of bonding (transferring) the internal electrode layer 12a and the blank pattern layer 24 with a surface of the green sheet 10a, the internal electrode layer 12a and the blank pattern layer 24 were bonded with (transferred to) the surface of the green sheet 10a in the same way as in the example 1.

Results of evaluating transferability in the same way as in the example 1 are shown in Table 1. When the adhesive layer is not formed, the pressing force and heating temperature become high and it was confirmed that the green sheet was broken.

Example 4

After forming the multilayer unit U1 shown in FIG. 4C, other than stacking 5 of the unit U1 and pressing in a mold, a multilayer block was obtained in the same way as in the examples 1 to 3. A test of transferability was conducted on 20 of same samples in the same way as in the example 1 and existence of delamination was observed. The results are shown in Table 1.

In the case of stacking a plurality of the multilayer units U1 in a mold to form a multilayer block, it was also confirmed that the same result can be obtained.

Example 5

As shown in Table 1, other than using an acrylic resin as a binder of the adhesive layer paste, using bis(2-hetylhexyl) phthalate DOP or (benzylbutyl phthalate) BBP as the plasticizer, and changing a kind of the binder of the green sheet paste, a test of transferability was conducted and existence of delamination was observed in the same way as in the example 1. The results are shown in Table 1.

When the adhesive layer includes substantially the same organic polymer material as that of a binder included in the green sheet, it was confirmed that the transferability improved and occurrence of delamination decreased.

Example 6

As shown in Table 1, other than using (benzylbutyl phthalate) BBP, (dioctyl adipate) DOA, (butylphthaloylbutyl glycolate) BPBG or (tributyl phosphate) TBP as a plasticizer included in the adhesive layer paste, a test of transferability was conducted and existence of delamination was observed in the same way as in the example 1. The results are shown in Table 1.

It was confirmed preferable that the plasticizer included in the adhesive layer paste was at least one of phthalate ester, glycol and adipic acid.

Example 7

As shown in Table 2, other than making an antistatic agent contained by 10 PHR in the adhesive layer paste, a test of transferability was conducted and existence of delamination was observed in the same way as in the example 1. The results are shown in Table 2. Note that 10 PHR of the antistatic agent is a part by weight of the antistatic agent when the adhesive layer binder (PUB) is 100 parts by weight.

As shown in Table 2, it was confirmed that when the antistatic agent contained in the adhesive layer paste was an imidazoline based surfactant, the transferability improved and delamination was not observed. Since antistatic agents other than imidazoline based ones had poor compatibility with the adhesive layer binder (PVB) and the adhesive layer was not able to be produced uniformly, so that the adhesive force remarkably declined.

TABLE 2

| | Adhesive Layer | | | | Common Material | | | Green Sheet | |
|---|---|---|---|---|---|---|---|---|---|
| | | Plasticizer | | | Powder | | Adhesive | Binder | |
| No. | Binder | Kind | Adding Quantity (PHR) | Antistatic agent | Particle Diameter (μm) | Adding Quantity (PHR) | Layer Thickness (μm) | Kind | Adding Quantity (PHP) |
| Example 7 | PVB | DOP | 50 | Imidazoline based 10PHR | None | None | 0.1 | PVB | 6 |
| Example 7 | ↑ | ↑ | ↑ | PEG400 10PHR | ↑ | ↑ | 0.1 | ↑ | ↑ |
| Example 7 | ↑ | ↑ | ↑ | Glycerin 10PHR | ↑ | ↑ | 0.1 | ↑ | ↑ |
| Example 8 | ↑ | ↑ | ↑ | Imidazoline based 10PHR | 0.05 | 10 | 0.2 | ↑ | ↑ |
| Example 8 | ↑ | ↑ | ↑ | ↑ | 0.1 | 10 | 0.2 | ↑ | ↑ |
| Example 8 | ↑ | ↑ | ↑ | ↑ | 0.2 | 10 | 0.2 | ↑ | ↑ |
| Example 8 | ↑ | ↑ | ↑ | ↑ | 0.3 | 10 | 0.2 | ↑ | ↑ |
| Example 9 | ↑ | ↑ | ↑ | ↑ | 0.1 | 20 | 0.2 | ↑ | ↑ |
| Example 9 | ↑ | ↑ | ↑ | ↑ | 0.1 | 40 | 0.2 | ↑ | ↑ |
| Example 9 | ↑ | ↑ | ↑ | ↑ | 0.1 | 50 | 0.2 | ↑ | ↑ |

TABLE 2-continued

| | Green Sheet | | | | | Adhesive Layer/ Dielectric | Adhesive Layer/ |
|---|---|---|---|---|---|---|---|
| | Plasticizer | | | Dielectric | | | |
| No. | Kind | Adding Quantity (PHR) | Sheet Thickness (μm) | Particle Diameter (μm) | Transfer-ability | Delam-ination | Particle Diameter (1 or thinner) | Sheet Thickness (0.2 or thinner) |
| Example 7 | DOP | 50 | 1 | 0.2 | ○ | ○ | 0.5 | 0.100 |
| Example 7 | ↑ | ↑ | 1 | 0.2 | X | — | 0.5 | 0.100 |
| Example 7 | ↑ | ↑ | 1 | 0.2 | X | — | 0.5 | 0.100 |
| Example 8 | ↑ | ↑ | 1 | 0.2 | ○ | ○ | 1 | 0.200 |
| Example 8 | ↑ | ↑ | 1 | 0.2 | ○ | ○ | 1 | 0.200 |
| Example 8 | ↑ | ↑ | 1 | 0.2 | ○ | ○ | 1 | 0.200 |
| Example 8 | ↑ | ↑ | 1 | 0.2 | X | — | 1 | 0.200 |
| Example 9 | ↑ | ↑ | 1 | 0.2 | ○ | ○ | 1 | 0.200 |
| Example 9 | ↑ | ↑ | 1 | 0.2 | X | — | 1 | 0.200 |
| Example 9 | ↑ | ↑ | 1 | 0.2 | X | — | 1 | 0.200 |

Example 8

As shown in Table 2, other than making an antistatic agent contained by 10 PHR and dielectric particles (common material powder) of 0.05 to 0.3 μm by 10 PHR and changing the adhesive layer thickness to 0.2 μm, a test of transferability was conducted and existence of delamination was observed in the same way as in the example 1. The results are shown in Table 2. Note that the PHR of the common material powder is a part by weight based on the same reference as that of the PHR of the antistatic agent.

It was confirmed to be preferable that the adhesive layer paste included dielectric particles and the dielectric particles had an average particle diameter of being equivalent to or smaller than that of the dielectric particles included in the green sheet paste.

Example 9

As shown in Table 2, other than making dielectric particles (common material powder) of 0.1 μm by 20 to 50 PHR and changing the adhesive layer thickness to 0.2 μm, a test of transferability was conducted and existence of delamination was observed in the same way as in the example 1. The results are shown in Table 2.

It was confirmed that an adding quantity of the common material powder was preferably 30 PHR or smaller. Also, it was confirmed that a weight based adding ratio of the dielectric particles included in the adhesive layer paste was preferably lower than that of the dielectric particles included in the green sheet paste. Note that an adding quantity of the dielectric particles included in the green sheet paste was 1667 PHR.

Example 10

Other than stacking 50 of the multilayer units U1 shown in FIG. 4C and pressing in a mold, a multilayer block was obtained in the same way as in the examples 1 to 3. After that, 8 of the multilayer block having 50 layers were stacked via adhesive layers 28 of 0.1 μm, the external layer green sheets 40 (refer to FIG. 8) were stacked on upper and lower surfaces thereof in the stacking direction, and final pressing was performed, so that a multilayer body, wherein 400 of the multilayer units U1 were stacked, was obtained. A ratio of the case where the green sheet was not broken was 60 to 95% (o).

The invention claimed is:

1. A production method of a multilayer electronic device, comprising the steps of:
   pressing an electrode layer against a surface of a green sheet to bond said electrode layer with the surface of said green sheet;
   stacking the green sheets bonded with said electrode layer to form a green chip; and
   firing said green chip;
   wherein
   before pressing said electrode layer against the surface of said green sheet, an adhesive layer having a thickness of 0.02 to 0.3 μm is formed on a surface of said electrode layer or the surface of said green sheet,
   said electrode layer is formed to be a predetermined pattern on a surface of a supporting sheet via a release layer, a surface of the release layer not formed with said electrode layer is formed with a blank pattern layer having substantially the same thickness as that of said electrode layer, and said blank pattern layer is composed of substantially the same material as that of said green sheet, and
   said release layer includes substantially the same dielectric as that composing said green sheet.

2. The production method of a multilayer electronic device as set forth in claim 1, wherein a thickness of said green sheet is 3 μm or thinner, and a thickness of said adhesive layer is ⅕ of the thickness of said green sheet or thinner.

3. The production method of a multilayer electronic device as set forth in claim 1, wherein said green sheet includes dielectric particles containing barium titanate as its main component, and an average particle diameter of said dielectric particles is 0.4 μm or smaller.

4. The production method of a multilayer electronic device as set forth in claim 3, wherein said green sheet includes an acrylic resin and/or a butyral based resin as a binder.

5. The production method of a multilayer electronic device as set forth in claim 1, wherein said adhesive layer includes substantially the same organic polymer material as that in a binder included in said green sheet.

6. The production method of a multilayer electronic device as set forth in claim 5, wherein said adhesive layer includes a plasticizer, the plasticizer is at least one of phthalate ester, glycol, adipic acid and phosphoric ester, and a weight based adding quantity of said plasticizer is not larger than that of said organic polymer material.

7. The production method of a multilayer electronic device as set forth in claim 5, wherein said adhesive layer includes an antistatic agent, the antistatic agent is an imidazoline based surfactant, and a weight based adding quantity of said antistatic agent is not larger than that of said organic polymer material.

8. The production method of a multilayer electronic device as set forth in claim 1, wherein said adhesive layer includes dielectric particles, and the dielectric particles have an average particle diameter equivalent to or smaller than that of dielectric particles included in said green sheet and has substantially the same kind of dielectric composition as that included in said green sheet.

9. The production method of a multilayer electronic device as set forth in claim 8, wherein a weight based adding ratio of dielectric particles included in said adhesive layer is lower than that of dielectric particles included in said green sheet.

10. The production method of a multilayer electronic device as set forth in claim 1, wherein:

processing of bonding said electrode layer with a surface of said green sheet and bonding another green sheet with a surface of said green sheet formed with the electrode layer is repeatedly performed to form a multilayer block, wherein a plurality of said green sheets are stacked via said electrode layers; and a plurality of said multilayer blocks are stacked via said adhesive layers to form said green chip.

11. The production method of a multilayer electronic device as set forth in claim 1, wherein said adhesive layer is formed by a transfer method.

12. The production method of a multilayer electronic device as set forth in claim 11, wherein said adhesive layer is formed on the surface of a supporting sheet in a releasable way first and pressed against the surface of said green sheet or the surface of said electrode layer to be transferred.

13. A production method of a multilayer electronic device, comprising the steps of:

pressing an electrode layer against a surface of a green sheet to bond said electrode layer with the surface of said green sheet;

stacking the green sheets bonded with said electrode layer to form a green chip; and firing said green chip;

wherein before pressing said electrode layer against the surface of said green sheet, an adhesive layer having a thinner thickness than an average particle diameter of dielectric particles included in said green sheet is formed on a surface of said electrode layer or the surface of said green sheet, said electrode layer is formed to be a predetermined pattern on a surface of a supporting sheet via a release layer, a surface of the release layer not formed with said electrode layer is formed with a blank pattern layer having substantially the same thickness as that of said electrode layer, and said blank pattern layer is composed of substantially the same material as that of said green sheet, and said release layer includes substantially the same dielectric as that composing said green sheet.

14. A production method of a multilayer electronic device, comprising the steps of:

repeating processing of bonding an electrode layer with a surface of a green sheet without using an adhesive layer and bonding another green sheet with a surface of said green sheet formed with the electrode layer to form a multilayer block, wherein a plurality of said green sheets are stacked via said electrode layers;

stacking each of a plurality of said multilayer blocks via said adhesive layer of 0.02 to 0.3 μm to form a green chip; and firing the green chip, wherein said electrode layer is formed to be a predetermined pattern on a surface of a supporting sheet via a release layer, a surface of the release layer not formed with said electrode layer is formed with a blank pattern layer having substantially the same thickness as that of said electrode layer, and said blank pattern layer is composed of substantially the same material as that of said green sheet; and said release layer includes substantially the same dielectric as that composing said green sheet.

* * * * *